United States Patent

Takahashi et al.

[11] Patent Number: 5,924,087
[45] Date of Patent: *Jul. 13, 1999

[54] FILE RETRIEVAL APPARATUS AND METHOD WITH A HIERARCHICAL STRUCTURED KEYWORD FORMAT THAT INCLUDES CORRESPONDING ATTRIBUTE INFORMATION FOR EACH KEYWORD

[75] Inventors: Fumiaki Takahashi, Machida; Hideo Takiguchi, Kawasaki, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/544,604

[22] Filed: Oct. 18, 1995

[30] Foreign Application Priority Data

Oct. 18, 1994 [JP] Japan .................................. 6-252114

[51] Int. Cl.$^6$ ............................................ G06F 17/30
[52] U.S. Cl. ..................................... 707/1; 707/2; 707/3
[58] Field of Search ........................... 395/603; 707/1, 707/2, 3, 5, 7

[56] References Cited

U.S. PATENT DOCUMENTS

| | | | |
|---|---|---|---|
| 4,318,184 | 3/1982 | Millett et al. | 707/1 |
| 5,146,604 | 9/1992 | Takada | 395/425 |
| 5,263,159 | 11/1993 | Mitsui | 707/5 |
| 5,265,242 | 11/1993 | Fujisawa et al. | 707/3 |
| 5,297,042 | 3/1994 | Morita | 707/5 |
| 5,499,360 | 3/1996 | Barbara et al. | 707/5 |
| 5,625,810 | 4/1997 | Kurosu et al. | 707/1 |

Primary Examiner—Paul V. Kulik
Assistant Examiner—Greta L. Robinson
Attorney, Agent, or Firm—Fitzpatrick, Cella, Harper & Scinto

[57] ABSTRACT

A file retrieval apparatus and method for retrieving a desired file out of a plurality of files stored in a storage medium. Retrieval is made based on the files, information on correspondence between the files and keywords, and attribute information of the keywords, to find a file that corresponds to an input keyword. When displaying the retrieved results in form of a list, a file a user most desires is displayed at the top of the list, and keywords located at lower levels of hierarchical keywords are also displayed as retrieval objects.

39 Claims, 5 Drawing Sheets

| FILE TITLE | KEY WORD |
|---|---|
| car1 | CAR |
| car2 | CAR |
| car3 | CAR |
| airPlane1 | AIRPLANE |
| airPlane2 | AIRPLANE |
| ship1 | SHIP |
| fcar1 | DOMESTIC CAR |
| train1 | TRAIN |
| train2 | TRAIN |
| bike1 | VEHICLE |
| tructer1 | VEHICLE |
| starShip1 | STARSHIP |
| starShip2 | STARSHIP |
| sCar1 | SPECIAL-PURPOSE CAR |
| sCar2 | SPECIAL-PURPOSE CAR |

FIG. 5

FILE RETRIEVAL APPARATUS AND METHOD WITH A HIERARCHICAL STRUCTURED KEYWORD FORMAT THAT INCLUDES CORRESPONDING ATTRIBUTE INFORMATION FOR EACH KEYWORD

BACKGROUND OF THE INVENTION

This invention relates to a file retrieval apparatus and method for finding a desired file from a plurality of files.

In a general operating system (OS), file management is made such that a user himself/herself generates tree-structured directories and arbitrarily stores a file in a desired directory. In this file management system, the user stores files containing the same subject matter for him/her in one directory as a file group, and makes the directory have hierarchical structure. This helps the user to perform retrieval of files.

In a recent data base system, a user sets a keyword with respect to an object file, and uses the keyword for retrieving the file. In this system, each file has its file name and one or more keywords. The user designates one or plural keywords, which may be included in the object file, in the form of logical operation. A retrieval device displays files corresponding to the logical operation of one or a plurality of keywords. If the object file is in the displayed files, the user designates the object file and thus performs file retrieval.

On the other hand, there exists a retrieval device for retrieval using hierarchical-structured keyword. In this device, keywords have a hierarchical structure by adopting a tree structure, similar to a directory structure of a general OS. The tree-structured keywords are displayed by display means. An operator uses the displayed tree-structured keywords to perform retrieval. Further, the device can edit the hierarchical structure of keywords by providing hierarchical-structure editing means.

Figure 5:
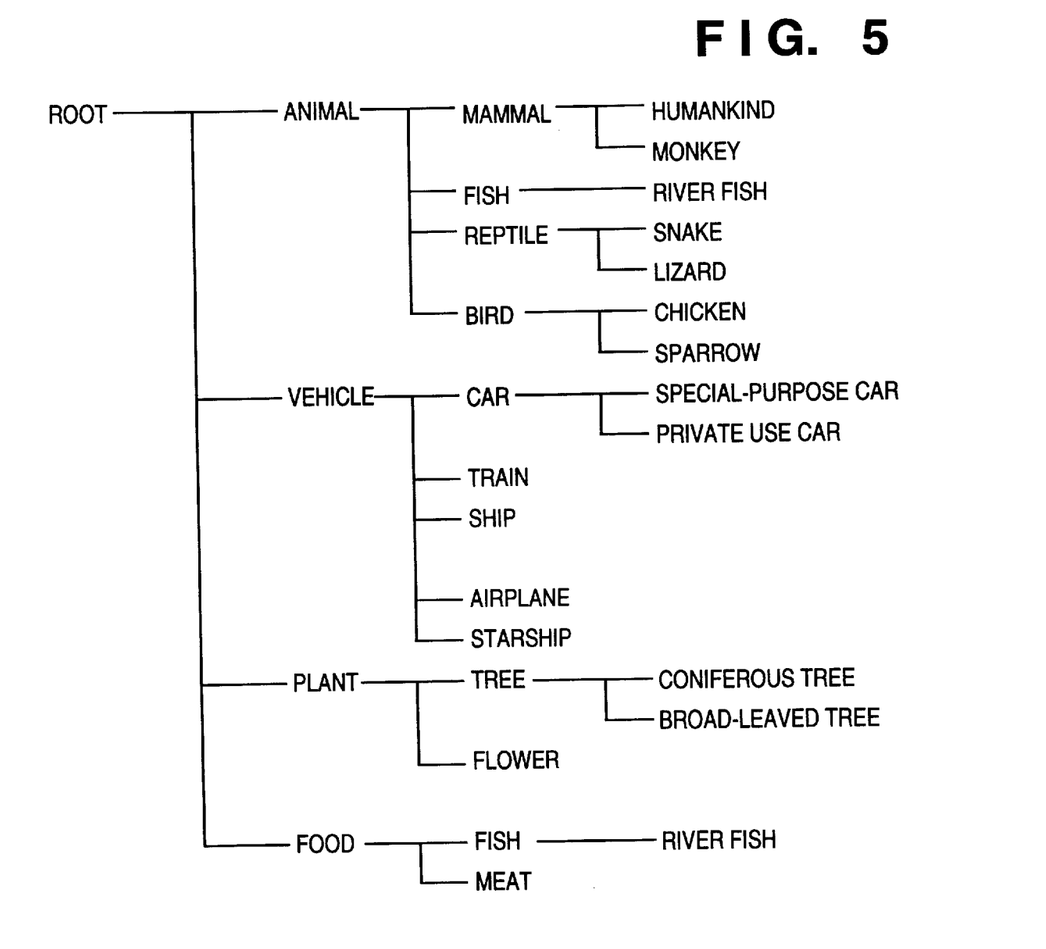
FIG. 5 is an example of keyword dictionary of the embodiment.

In the conventional retrieval device, in a case where retrieval is made by using hierarchical-structured keywords having a structure as shown in FIG. 5, a keyword "car" which is designated by the user is developed into:

car = car + (special-purpose car + private use car)

= car + (special-purpose car (ambulance + patrol car) + private use car)

Then, files having keywords "car, special-purpose vehicle, ambulance, patrol car, private use car" are displayed as retrieval results.

However, in the conventional file management system in OS, there is only one retrieval path for retrieving a file stored in a storage medium. If a user wants to treat a file with a plurality of aspects, this kind of file management system is inconvenient. That is, within the hierarchical structure generated in accordance with the user's intention, if one file has a plurality of meanings to a user, retrieval of that file should be made from a plural portions of a hierarchical structure. However, in the conventional file management system, such retrieval is impossible.

Further, in recent data-base retrieval using a keyword, a plurality of keywords are added to one file so as to give a plurality of meanings to the file. However, there is a problem that a user cannot form a hierarchical structure of keywords in accordance with his/her intended meanings, and cannot use such hierarchical structure for retrieval.

Furthermore, in a retrieval method of the conventional retrieval device using hierarchical-structured keywords, the retrieval point becomes out of focus because the retrieval range is too wide. A user may fail to find a desired file quickly even when he/she refers to a list of retrieved files.

SUMMARY OF THE INVENTION

The present invention has been made in consideration of the above problems and has its object to provide a file retrieval apparatus and method capable of quickly finding a desired file out of a plurality of files.

The above object is attained by providing a retrieval apparatus for retrieving a desired file from a plurality of files stored in a storage medium, comprising:

means for adding keywords with respect to the plurality of files;

means for storing correspondence information between the plurality of files and the keywords;

means for storing attribute information of the keywords;

retrieval means for retrieving a file which corresponds to a keyword inputted in a predetermined input operation by referring to the correspondence information and the attribute information; and display means for displaying results from retrieval by the retrieval means.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
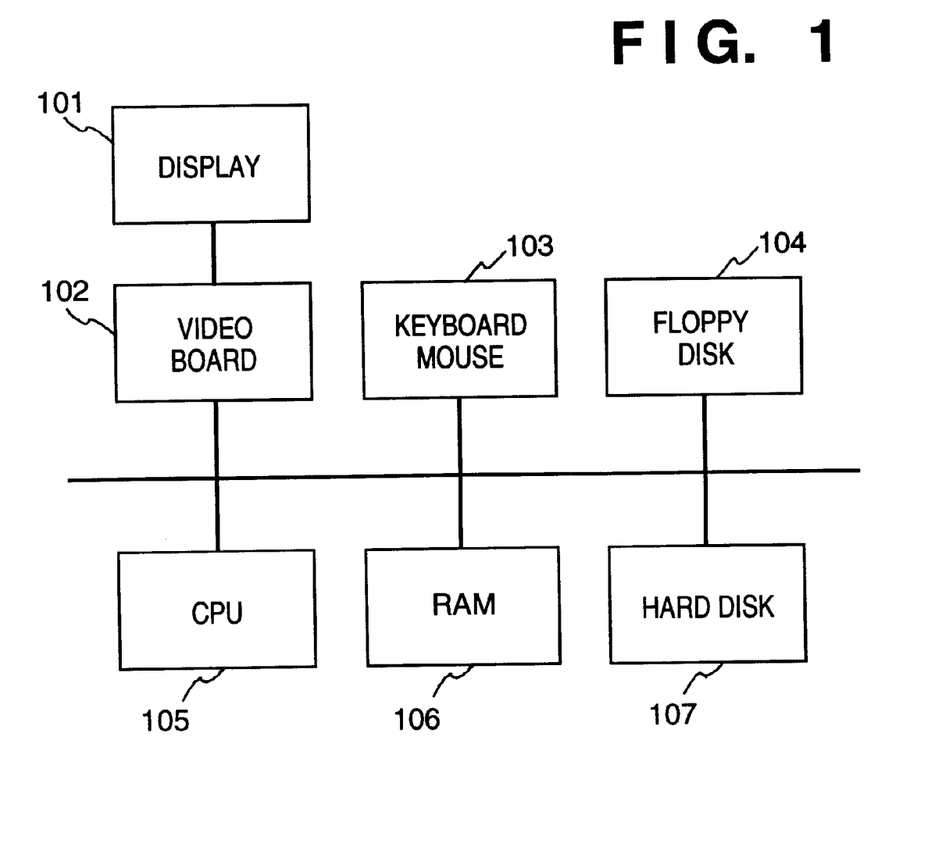
FIG. 1 is a block diagram showing the hardware construction of a retrieval apparatus according to an embodiment of the present invention.

FIG. 1 is a block diagram showing the hardware construction of a retrieval apparatus according to an embodiment of the present invention. As it is apparent from FIG. 1, the retrieval apparatus may be replaced with a general personal computer (PC).

In FIG. 1, the retrieval apparatus comprises a display 101, a video board 102, a keyboard/mouse 103 and a floppy disk 104, which are provided in the above-mentioned general PC.

A software program used for activating the hardware as a retrieval apparatus is stored in a hard disk 107. A CPU 105 loads the software program into a RAM 106 and executes the loaded program. Thus, the hardware construction operates as a retrieval apparatus.

Figure 2:
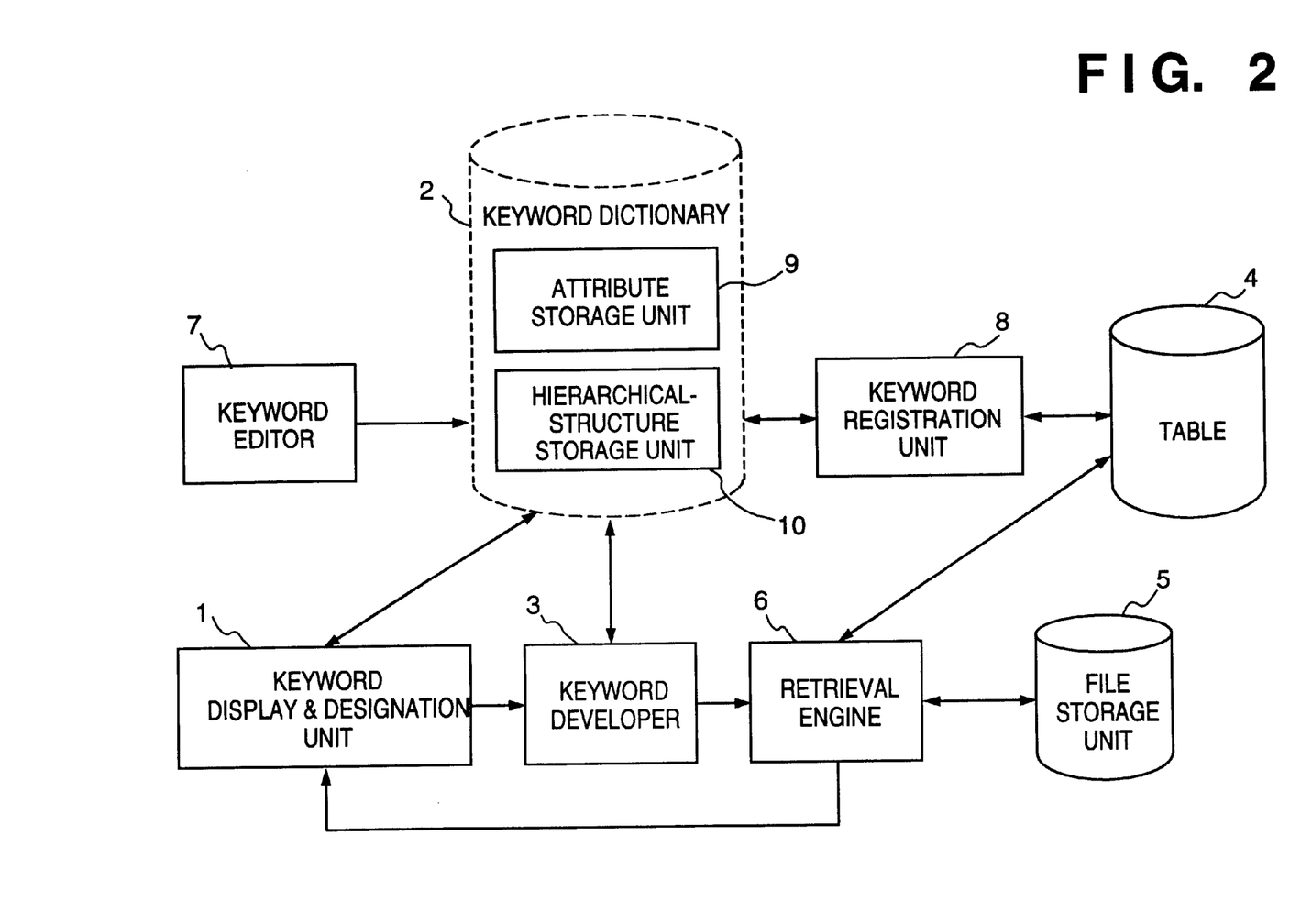
FIG. 2 is a block diagram showing the logical construction of the retrieval apparatus of the embodiment.

FIG. 2 is a block diagram showing the logical construction of the retrieval apparatus of the embodiment. In FIG. 2, reference numeral 1 denotes a hierarchical keyword display & designation unit which displays hierarchical keyword groups and designates logical operation of a keyword or a plurality of keywords, which may be stored in an object file to be retrieved by a user. The hierarchical keyword display & designation unit 1 also has a display function to present the user with retrieval results by displaying, regarding the retrieved file, at least one of a file name, a file title and internal data. Note that the hierarchical keyword display & designation unit 1 comprises, e.g., a display as display means and a mouse or a keyboard as input means.

Numeral 2 denotes a hierarchical keyword dictionary in which current keywords, the hierarchical structure of a keyword group constituting the keywords and attribute information of each keyword are stored. The hierarchical keyword dictionary 2 comprises a hierarchical-structure storage unit 10 for storing the hierarchical structure of the keywords and attribute storage unit 9 for storing the keyword attributes (attribute information of keywords).

Numeral 3 denotes a hierarchical keyword developer which refers to the hierarchical keyword dictionary 2, based on the hierarchical-structured keywords designated by the hierarchical keyword display & designation unit 1 or logical operation of the hierarchical-structured keywords, and picks up a keyword group located at lower levels of the designated hierarchical-structured keywords, then generates a logical equation for retrieval so that the retrieval is performed on the picked up keywords.

When the equation by the developer has a plurality of terms (keywords), the hierarchical keyword developer 3 performs sorting on the terms in accordance with the user's desired display order. Note that the sorting will be described in detail later.

Numeral 4 denotes a table which contains a list of a respective correspondence among file names stored in a file storage unit 5, keywords respectively added to each of the file names, and file titles. Numeral 7 denotes a keyword editor, and 8, a keyword registration unit for setting correspondence between files and keywords.

Numeral 6 denotes a retrieval engine for referring to the table 4 based on a retrieval-designation keyword and taking a file which corresponds to the retrieval-designation keyword out of the file storage unit 5.

Figure 3:
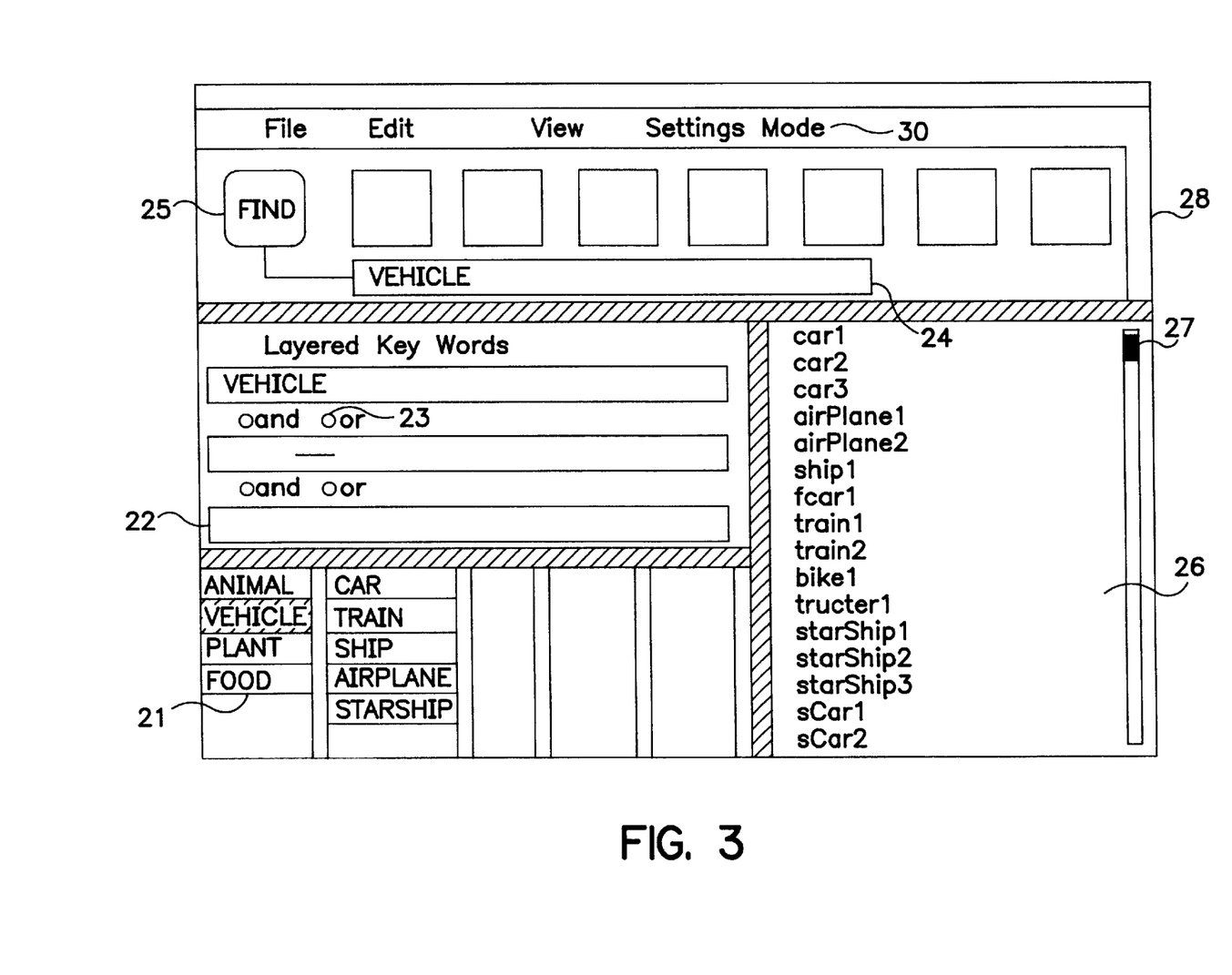
FIG. 3 is an example of user interface of keyword display & designation unit of the embodiment.
Figure 4:
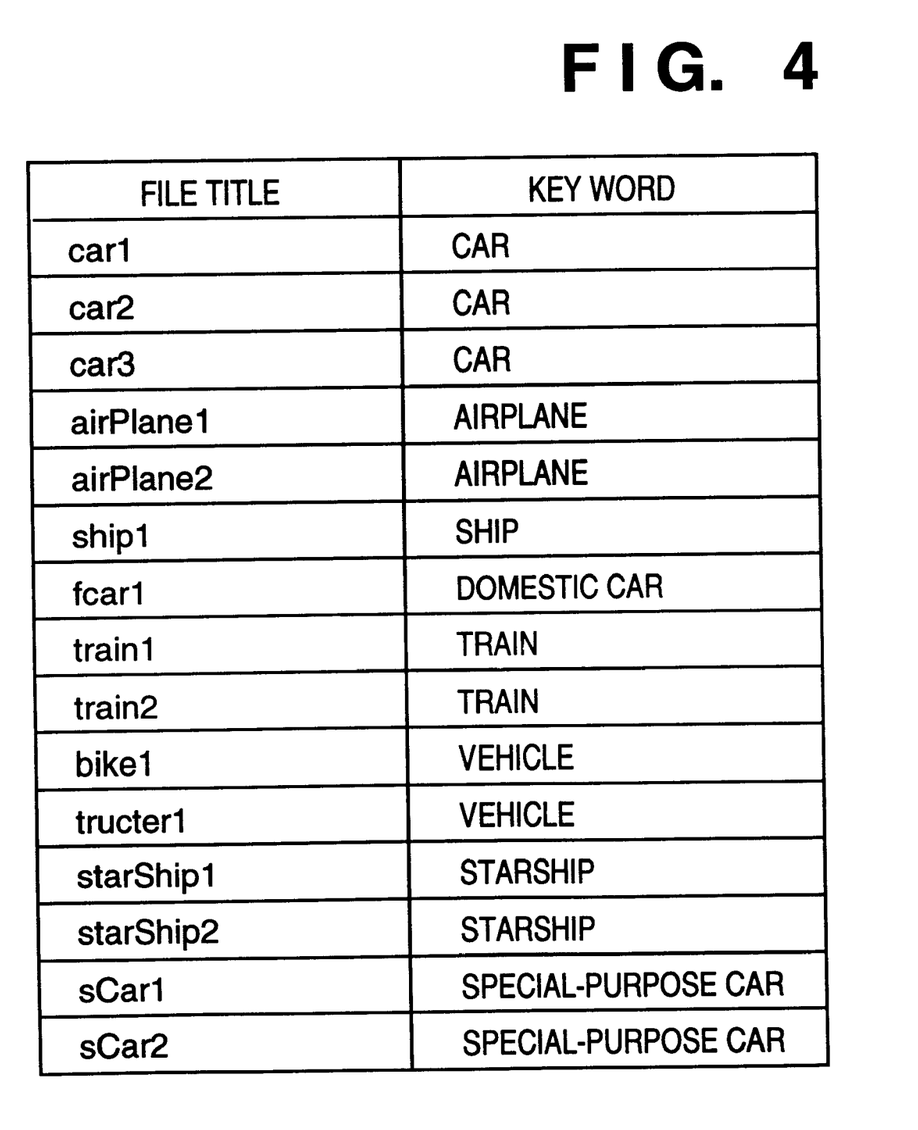
FIG. 4 is an explanatory view showing correspondence between file titles and keywords.

FIG. 3 shows an example of user interface in the retrieval apparatus of the present embodiment. FIG. 4 shows the file titles and corresponding keywords according to the present embodiment.

In FIG. 3, numeral 30 denotes a display for mode change. On graphical user interface, this display forms a menu-bar image. A user can set a display order of the files as retrieval results by using this menu bar. In this embodiment, one of the following four display orders can be selected:

Display Order 1: to display files in frequency of keyword retrieval order, in which a file having keywords most frequently retrieved in the past searches comes first.

Display Order 2: to display files in date and time of keyword retrieval order, in which a file having keywords latest retrieved comes first.

Display Order 3: to display files in date and time of keyword generation order, in which a file having keywords latest generated comes first.

Display Order 4: to display files in significance of keyword order, in which a file having the most-significant keyword comes first.

Note that in this embodiment, the above-mentioned "display order 1" is selected as a current mode.

Numeral 28 denotes a window displayed on the display 101; 21, a browser displaying, e.g., hierarchical structure of keywords in accordance with the hierarchical structure as shown in FIG. 5. A user can designate a keyword on the browser 21 by, e.g., "double-clicking" the keyword with a mouse.

Also, the user can designate a keyword by directly inputting the keyword using, e.g., a key board and the like which acts as input means, into a text field 22 or text field 24.

The browser 21, text fields 22 and 24 have designation-keyword data in common. If a keyword "vehicle" on the browser 21 is double-clicked, a character "vehicle" appears in the text fields 22 and 24.

Numeral 23 denotes a radio button for "and/or" selection. As the above-described keyword designation has been made, the user clicks a FIND button 25 to instruct the start of retrieval. Then, titles obtained as the results of the retrieval are listed at a position indicated by a numeral 26.

Note that in this embodiment, the files registered in the retrieval apparatus all have titles as attributes, and retrieval results are displayed as the titles. However, the retrieval results may be displayed by file names or images corresponding to the files.

In the user interface shown in FIG. 3, a hierarchical keyword designated as a retrieval object is "vehicle". When the user starts retrieval using the FIND button 25, the hierarchical keyword developer 3 develops the hierarchical structure of keywords, in accordance with a logical equation 1 to be described later. The hierarchical keyword developer 3 refers to the hierarchical-structure storage unit 10, and replaces each keyword included in the logical equation 1 with a logical sum of the keyword and all key words located at lower level of the keyword.

For example, if the hierarchical-structure storage unit 10 has a hierarchical-structured keywords as shown in FIG. 5, a keyword "vehicle" is developed as follows, which provides the logical equation 1:

$$\text{vehicle} = \text{vehicle} + \text{car} + \text{train} + \text{ship} + \text{airplane} + \text{starship}$$

(+ : logical OR)

As the keyword "vehicle" has keywords in its lower-leveled location, those keywords are also developed as follows:

vehicle=vehicle+car+special-purpose car+private use car+train+ship+airplane+starship Next, as the display order 1 is selected as the current mode, the attribute storage unit 9 in the hierarchical keyword dictionary 2 is referred to so as to arrange the keywords in the logical equation 1 in frequency of keyword retrieval order, that is, a keyword retrieved most frequently in the past search comes first.

Note that in this embodiment, the attribute storage unit 9 holds information, as attributes of the keywords, as follows:

ATR1: the number of retrievals using the keyword

ATR2: date and time of the latest retrieval of the keyword

ATR3: date and time when the keyword was generated by the keyword editor 7

ATR4: significance of the keyword weighted by a user

In this embodiment, as the display order 1 is selected, the ATR1 is referred to. As a result, the respective keywords are retrieved the number of times as follows:

vehicle: 4 times, car: 18 times, special-purpose car: 0 time, private use car: 10 times, ship: 14 times, airplane: 17 times, starship: 2 times, train: 10 times Accordingly, the logical equation 1 is transformed into a logical equation 2 as shown below, then sent to the retrieval engine 6.

vehicle=car+airplane+ship+private use car+train+vehicle+starship+special-purpose car The retrieval engine 6 performs retrieval sequentially from the leftmost keyword of the right side of the logical equation 2, then sequentially sends the retrieval results to the hierarchical keyword display & designation unit 1. Therefore, the retrieval results are displayed the in the order corresponding to the display order 1. That is, the file names are listed in the area 26 as the results from retrieval using the keyword "vehicle". The keywords of the respective files are shown in FIG. 5. It can be understood from FIG. 5 that the files are displayed in regular order from the file having the most-frequently retrieved keyword.

A file retrieval is executed based on not only the above-mentioned "ATR1", but "ATR2", "ATR3" or "ATR4" with a similar transformation of the equation.

As described above, when information corresponding to keywords, which is stored in the attribute storage unit 9, is utilized for file retrieval, retrieval results are displayed in such order that the most-frequently accessed file comes to the top of the list. Keywords which are located at the lower-level of the keyword in the hierarchical structure are also displayed as retrieval results. Then the user can easily find a desired file out of the list of files.

In other words, the desired file can be easily found by arranging keywords used for retrieval to form a hierarchical structure, and utilizing attribute information of the keywords.

Further, as a file-display order is selected among a plurality of orders, file retrieval is easily made by displaying files in the most-convenient file display which is selected among a plurality of orders.

Note that in this example, one keyword, "vehicle", is used for retrieval, however, the number of keywords is not limited to one. For example, display order of retrieval results may be controlled by developing a plurality of logical equations of keywords and applying the above-mentioned keyword arrangement to the keywords.

The present invention can be applied to a system constituted by a plurality of devices or to an apparatus comprising a single device.

Furthermore, the invention is also applicable to a case where the invention is embodied by supplying a program to a system or apparatus. In this case, a storage medium such as a floppy disc or a CD-ROM, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A retrieval apparatus for retrieving a file stored in a storage medium using a keyword which has a tree structure, comprising:

memory means for storing attribute information which corresponds to the keyword;

input means for inputting a keyword to be retrieved;

retrieval means for retrieving a file which corresponds to the keyword inputted by said input means and a file which corresponds to a keyword located at lower levels of the inputted keyword; and output means for outputting files retrieved by said retrieval means in an outputting order on the basis of the attribute information stored in said memory means.

2. The retrieval apparatus according to claim 1, wherein said output means is a display for displaying files.

3. The retrieval apparatus according to claim 1, wherein the attribute information is indicative of frequencies of each keyword inputted for retrieval.

4. The retrieval apparatus according to claim 3, wherein said output means outputs files in frequency order which correspond to keywords most-frequently inputted.

5. The retrieval apparatus according to claim 1, wherein the attribute information is indicative of the date and time of the latest retrieval by said retrieval means using the keyword.

6. The retrieval apparatus according to claim 1, wherein the attribute information is indicative of the registration date and time of the keyword.

7. The retrieval apparatus according to claim 1, wherein the attribute information is indicative of the significance inputted at the time of registration of the keyword.

8. A retrieval method for retrieving a file stored in a storage medium using a keyword which has a tree structure, comprising:

a memory step of storing attribute information which corresponds to the keyword;

an input step of inputting a keyword to be retrieved;

a retrieval step for retrieving a file which corresponds to the keyword inputted in said input step and a file which corresponds to a keyword located at lower levels of the inputted keyword; and an output step of outputting files retrieved in said retrieval step in an outputting order on the basis of the attribute information stored in said memory step.

9. The retrieval method according to claim 8, wherein at output step, a display for displaying files is provided.

10. The retrieval method according to claim 8, wherein the attribute information is indicative of a number of keywords inputted for retrieval.

11. The retrieval method according to claim 10, wherein at said output step, the files are outputted in frequency order which corresponds to keywords most-frequently inputted.

12. The retrieval method according to claim 8, wherein the attribute information is indicative of date and time of the latest retrieval by said retrieval means using the keyword.

13. The retrieval method according to claim 8, wherein the attribute information is indicative of registration date and time of the keyword.

14. The retrieval method according to claim 8, wherein the attribute information is indicative of significance inputted at the time of registration of the keyword.

15. A storage medium storing a program for retrieving a file using a keyword which has a tree structure comprising:

means for storing attribute information which corresponds to the keyword;

means for inputting a keyword to be retrieved;

retrieval means for retrieving a file which corresponds to the inputted keyword and a file which corresponds to a keyword located at lower levels of the inputted keyword; and means for outputting files retrieved by said retrieval mean in an outputting order on the basis of the attribute information.

16. The medium according to claim 15, wherein said outputted files are displayed a display.

17. The medium according to claim 15, wherein the attribute information is indicative of a number of keywords inputted for retrieval.

18. The medium according to claim 17, wherein said outputted files are outputted in frequency order which corresponds to keywords most-frequently inputted.

19. The medium according to claim 15, wherein the attribute information is indicative of date and time of the latest retrieval by using the keyword.

20. The medium according to claim 15, wherein the attribute information is indicative of registration date and time of the keyword.

21. The medium according to claim 15, wherein the attribute information is indicative of significance inputted upon registration of the keyword.

22. The retrieval apparatus for retrieving a file stored in a storage medium using a keyword which has a tree structure, comprising:

memory means for storing attribute information which corresponds to the keyword;

input means for inputting a keyword to be retrieved;

retrieval means for retrieving a file which corresponds to the keyword inputted by said input means and a file which corresponds to a keyword located at lower levels of the inputted keyword; and displaying means for displaying the result retrieved by said retrieval means in a displaying order on the basis of the attribute information stored in said memory means.

23. The retrieval apparatus according to claim 22, wherein the attribute information is indicative of frequencies of each keyword inputted for retrieval.

24. The retrieval apparatus according to claim 23, wherein said displaying means displays files in frequency order which correspond to keywords most-frequently inputted.

25. The retrieval apparatus according to claim 22, wherein the latest retrieval by said keyboard means using the keyboard occurs at a particular date and time, and wherein the attribute information is indicative of the date and time of the latest retrieval by said retrieval means using the keyword.

26. The retrieval apparatus according to claim 22, wherein the attribute information is indicative of a registration date and time of the keyword.

27. The retrieval apparatus according to claim 22, wherein the attribute information is indicative of a significance inputted at the time of registration of the keyword.

28. A retrieval method for retrieving a file stored in a storage medium using a keyword which has a tree structure, comprising:

a memory step of storing attribute information which corresponds to the keyword;

a retrieval step of retrieving a file which corresponds to the keyword inputted in said input step and a file which corresponds to a keyword located at lower levels of the inputted keyword; and a displaying step of displaying the result retrieved in said retrieval step in a displaying order on the basis of the attribute information which corresponds to the keyword.

29. The retrieval method according to claim 28, wherein the attribute information is indicative of frequencies of each keyword inputted for retrieval.

30. The retrieval method according to claim 29, wherein said displaying step displays files in frequency order which correspond to keywords most-frequently inputted.

31. The retrieval method according to claim 28, wherein the attribute information is indicative of the date and time of the latest retrieval by said retrieval step using the keyword.

32. The retrieval method according to claim 28, wherein the attribute information is indicative of the registration date and time of the keyword.

33. The retrieval method according to claim 28, wherein the attribute information is indicative of the significance inputted at the time of registration of the keyword.

34. A computer usable storage medium storing a program for causing a computer to retrieve a file using a keyword which has a tree structure, said medium comprising:

first means for causing the computer to input a keyword to be retrieved;

second means for causing the computer to retrieve a file which corresponds to the inputted keyword and a file which corresponds to a keyword located at lower levels of the inputted keyword; and means for causing the computer to display the result caused to be retrieved by said second means in a displaying order on the basis of the attribute information which corresponds to the keyword.

35. The medium according to claim 34, wherein the attribute information is indicative of frequencies of each keyword inputted for retrieval.

36. The medium according to claim 35, wherein said thrid means causes the computer to display files in frequency order which correspond to keywords most-frequently inputted.

37. The medium according to claim 34, wherein the attribute information is indicative of the date and time of the latest retrieval caused to be performed by said second means using the keyword.

38. The medium according to claim 34, wherein the attribute information is indicative of the registration date and time of the keyword.

39. The medium according to claim 34, wherein the attribute information is indicative of the significance inputted at the time of registration of the keyword.

* * * * *

UNITED STATES PATENT AND TRADEMARK OFFICE
CERTIFICATE OF CORRECTION

PATENT NO. : 5,924,087

DATED : July 13, 1999

INVENTOR(S): FUMIAKI TAKAHASHI, ET AL.

It is certified that error appears in the above-identified patent and that said Letters Patent is hereby corrected as shown below:

SHEETS 3 & 4 OF THE DRAWINGS, IN FIGURES 3 & 4:
"tructer 1" should read --tractor--.

COLUMN 1:
Line 28, "keyword." should read --keywords--.
Line 56, "from a" should read --from--.

COLUMN 2:
Line 6, "has" should read --has as--.
Line 47, "&" should read --and--.

COLUMN 3:
Line 9, "&" should read --and--.
Line 13, "&" should read --and--.
Line 30, "&" should read --and--.

COLUMN 4:
Line 40, "at" should read --at a--.
Line 42, "a" should be deleted.

COLUMN 5:
Line 16, "&" should read --and--.
Line 17, "the in" should read --in--.

UNITED STATES PATENT AND TRADEMARK OFFICE
CERTIFICATE OF CORRECTION

PATENT NO. : 5,924,087

DATED : July 13, 1999

INVENTOR(S): FUMIAKI TAKAHASHI, ET AL.

It is certified that error appears in the above-identified patent and that said Letters Patent is hereby corrected as shown below:

COLUMN 7:
Line 1, "mean" should read --means--.
Line 5, "a" should read --on a--.

COLUMN 8:
Line 40, "thrid" should read --third--.

Signed and Sealed this

Thirtieth Day of May, 2000

Attest:

Q. TODD DICKINSON

Attesting Officer

Director of Patents and Trademarks